(12) United States Patent
Rzadki et al.

(10) Patent No.: US 7,335,072 B2
(45) Date of Patent: Feb. 26, 2008

(54) MARINE - (NAVY) SHIP-TYPE EQUIPMENT SYSTEM FOR ELECTRICALLY DRIVEN MARINE-(NAVY) SHIPS HAVING DIFFERENT SIZEDS AND DRIVING POWER

(75) Inventors: Wolfgang Rzadki, Glinde (DE); Karl-Otto Sadler, Hamburg (DE); Matthias Schulze, Lüneburg (DE); Hannes Schulze Horn, Gladbeck (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/527,709

(22) PCT Filed: Sep. 12, 2003

(86) PCT No.: PCT/DE03/03035

§ 371 (c)(1),
(2), (4) Date: Mar. 23, 2006

(87) PCT Pub. No.: WO2004/026685

PCT Pub. Date: Apr. 1, 2004

(65) Prior Publication Data

US 2006/0205292 A1 Sep. 14, 2006

(30) Foreign Application Priority Data

Sep. 14, 2002 (DE) .......................... 202 14 297 U

(51) Int. Cl.
*B60L 11/00* (2006.01)
(52) U.S. Cl. ........................................................ 440/6
(58) Field of Classification Search ...................... 440/6
See application file for complete search history.

(56) References Cited

U.S. PATENT DOCUMENTS

| 873,539 | A | | 9/1907 | Hyman et al. |
|---|---|---|---|---|
| 5,102,359 | A | * | 4/1992 | Hinds .......................... 440/66 |

FOREIGN PATENT DOCUMENTS

FR  2 616 967 A  12/1988

(Continued)

OTHER PUBLICATIONS

Dreger W: "Entwicklungstendezen Beim Bau Zukuenftiger Korvetten Und Fregatten", Schiff Und Hafen, Seehafen-Verlag Erik Blumenfeld. Hamburg, DE, vol. 53, No. 4, Apr. 2001, pp. 47-52, XP001112254, ISSN: 0938-1643.

(Continued)

*Primary Examiner*—Stephen Avila
(74) *Attorney, Agent, or Firm*—Harness, Dickey & Pierce, P.L.C.

(57) ABSTRACT

A marine-(navy) or commercial or yacht ship-type equipment system is for electrically driven ships having different sizes and driving power. The ships, as well as coast guard boats and customs boats, include standardized equipment segments for the propulsion and operation thereof. The individual equipment system for ship types consists of hulls, which are embodied according to the type of ship, i.e. are made according to size and specific task requirements and the equipment segments for propulsion, such as electrical oar propellers and waterjets, and for the operation of the ship such as the energy generator, the energy distributor and automation elements, are embodied according to type and according to driving power and function of the individual ships. The equipment segments are embodied in a prefabricated manner and can be installed on different areas in the hull of the ship.

33 Claims, 9 Drawing Sheets

FOREIGN PATENT DOCUMENTS

GB    1 467 871    3/1977
WO    WO 02/057132 A1    7/2002

OTHER PUBLICATIONS

Gamble B. And Goldman J.: "High temperature superconducting motors and generators fo submarines and surface ships", Proceedings Navel Symposium on Electic Machines, Jul. 28-28, 1997, pp. 275-282, XP008000614, newport, USA. p. 275, p. 282.

Sharke P: "The Hunt for Compact Power", Geophysics, Society of Exploration Geophysicists. The American Society of Mechanical Engineering., Apr. 2000, page Complete XP008000664, Tulsa, USA ISSN: 0016-8033.

Ehrenberg H D: "Gebaute Einheiten Und Neueste Entwicklungen", Schiff Und Hafen, Seehafen-verlag Erik Blumenfeld. Hamburg, DE, vol. 48, No. 12, Dec. 1, 1996, pp. 37-38, XP000641578, ISSSN: 0938-1643.

International Search Report, International Preliminary Examination Report and German Translation Aid.

* cited by examiner

FIG 1
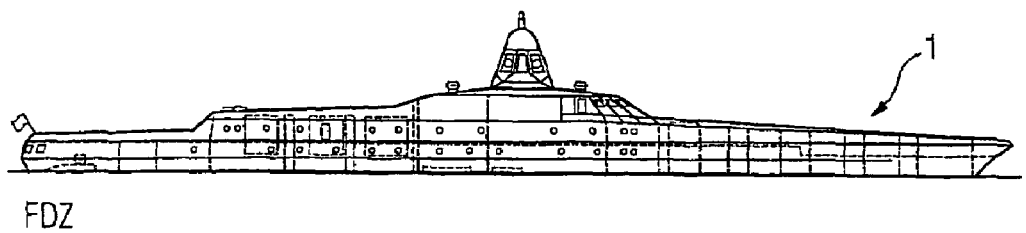
FDZ
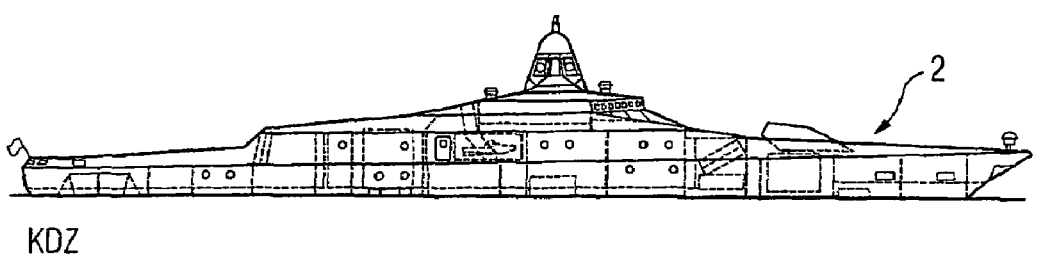
KDZ
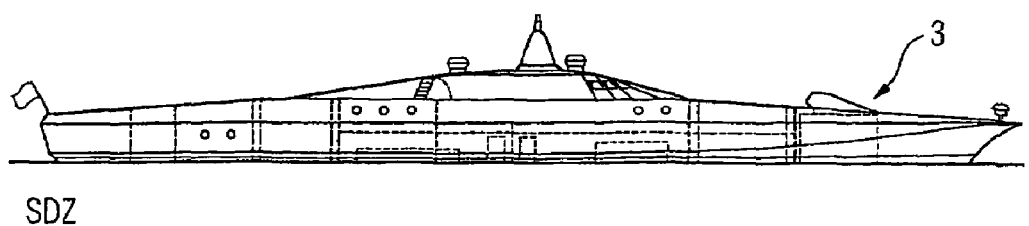
SDZ
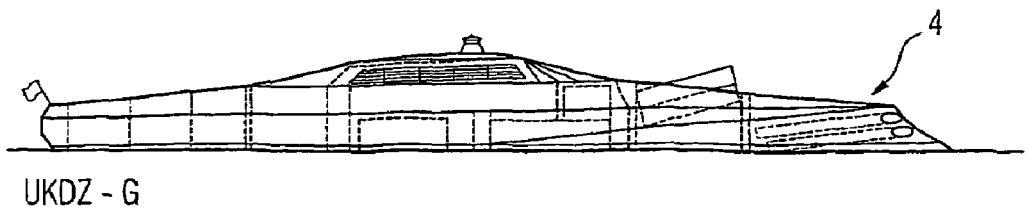
UKDZ - G

FIG 10 UKDZ-G

US 7,335,072 B2

MARINE - (NAVY) SHIP-TYPE EQUIPMENT SYSTEM FOR ELECTRICALLY DRIVEN MARINE-(NAVY) SHIPS HAVING DIFFERENT SIZEDS AND DRIVING POWER

This application is the national phase under 35 U.S.C. § 371 of PCT International Application No. PCT/DE2003/003035 which has an International filing date of Sep. 12, 2003, which designated the United States of America and which claims priority on German Patent Application number DE 202 14 297.3 filed Sep. 14, 2002, the entire contents of which are hereby incorporated herein by reference.

FIELD OF THE INVENTION

The invention generally relates to a navy vessel type equipment system for electrically propelled navy vessels of various sizes and propulsion power. Preferably, it relates to one in which the navy vessels, for example frigates, corvettes, high-speed patrol boats, unmanned attack boats or supply vessels (equipment system vessels) have standard equipment segments for propulsion and vessel operation, including the power generation, the power distribution and automation.

BACKGROUND OF THE INVENTION

WO 02/057132 A1 discloses a high-speed military surface vessel which includes the modern requirements for low emissions and high survivability in the event of a hit.

SUMMARY OF THE INVENTION

An object of an embodiment of the invention is to specify a vessel type equipment system which builds on the technology of the known high-speed military surface vessel and at the same time allows a considerable cost reduction, particularly for new equipment system vessel types. A further aim of at least one embodiment is additionally to shorten the incorporation time required by the technical personnel for these equipment system vessel types to a minimum, and to simplify the logistics.

An object may be essentially achieved by extending the vessels according to an embodiment of the invention beyond the "frigate" and "corvette" equipment system types to smaller equipment system vessel types. Vessel hulls may be provided for the individual navy vessel types which are designed on a type-dependent basis, that is to say on a size and task-specific basis.

Equipment segments for propulsion and vessel operation may be designed to be fundamentally independent of the type, including the power generation, the power distribution and automation, and to have the capability to be combined depending on the propulsion power and task of the individual navy vessels. The equipment segments are designed such that they can be installed in a prefabricated manner at different locations in the vessel hull, if required being matched to the specific vessel type by simplification or reduction in size.

It is thus possible to use the latest equipment segments, which have been produced in relatively large quantities, for different new vessel types. The numbers produced are correspondingly increased, the development cost component is reduced, and the maintenance, spares holdings, provision of replacement equipment segments, etc, are also correspondingly more cost-effective. This is made possible by the type-independent design and capability of the individual equipment segments to be combined according to the invention in order to provide the required overall propulsion power for sailing at up to cruise speed and for reaching battle speed or top speed.

It is particularly advantageous for the system concept for the equipment segments to be designed to be small and light in comparison to their power and to have electrical devices using high-temperature superconducting technology for this purpose. These devices may be both motors and generators or current limiters for the power supply network required in the vessel. The highly advantageous use of components which are designed using HTS technology reduces the weights and the space required for the individual equipment segments for power generation and propulsion as well as for the switching devices which are required for reliable power supply to such an extent that it is possible to provide, so to speak, any desired combination capability in the vessel and installation at the respectively most suitable location in the vessel.

In this case, it is advantageously possible for each vessel protection area that is formed to be equipped both with autonomously operating propulsion devices and with appropriate power generation devices for them. Thus, this results in equipment system type vessels which still have a reaction capability and can at least be moved away from the point at which they are receiving hits even after taking hits and the failures resulting from them in a vessel protection area, including amidships or at the stern, by relatively large missiles or by torpedoes.

While it has already been normal practice for a long time to use vessel-type-independent equipment segments for the weapon system parts and the navigational equipment in navy vessels, it has until now been regarded as being impossible to do this for the propulsion equipment segments and the equipment segments for vessel operation and for power generation, power distribution and, to some extent, for automation as well. Until now, these segments have been designed such that they have been specifically matched to each vessel size and such that the respective vessel has been designed for these segments. Otherwise, the trim, the maneuverability and the general seaworthiness, etc, would not have been appropriate.

However, the modern, new, small equipment segments which can be combined with one another according to an embodiment of the invention have amazingly made it possible to equip even slim warships with their very high space requirement below decks with standard equipment segments for propulsion and for vessel operation including power generation, power distribution and automation with an advantageous improvement in reliability without having to accept worse performance in terms of seaworthiness, maneuverability and operational capability etc. In this case, the design of the appropriate equipment segments using HTS technology has, in particular, been a significant factor which—as more detailed analysis of the vessels to be equipped has shown—allows navy vessels to be equipped with standard equipment segments even for different vessel sizes, and for different tasks, etc.

According to an embodiment of the invention, the provision of electrical equipment segments for propulsion and vessel operation including power generation, distribution and automation, for example fuel cell systems, gas turbine generator sets, diesel engine generator sets, steering propeller propulsion systems, waterjet propulsion systems, inboard propulsion systems, power distribution systems for AC and/or DC medium voltage and/or low voltage as well as automation systems which can be used in a modular form and can at the same time be combined with one another in order that they can be integrated in a vessel type equipment system for vessels of different size and power and thus in different national navies allow optimum configuration of their surface navy vessels. These equipment segments can also be used for civil vessels, and they are particularly suitable for vessels with jurisdiction tasks or for super-yachts.

One refinement of an embodiment of the invention provides for the equipment segments to include small and light propulsion equipment segments in their power, which have electric motors using high-temperature superconducting (HTS) technology, in particular electric motors with rotor windings that are cooled directly or indirectly by liquid neon or liquid nitrogen. The use of motors using high-temperature superconducting (HTS) technology makes it possible to achieve elegant solutions for the significant weight and volume problems that occur in vessel propulsion systems. For example, this makes it possible to achieve electrical steering propellers in the power range between 5 and 8 Megawatts with less than one third of the weight of conventional motors or complete steering propellers.

At the same time, better electromagnetic characteristics and a better noise behavior can be achieved. Thus, the equipment system vessels, to the extent that they are equipped with electrical steering propeller propulsion systems (PODS), are not as easy to detect by underwater vessels as navy vessels with conventional propulsion systems.

A further refinement of an embodiment of the invention provides for the equipment segments to have small and light power generation units in comparison to their power, which are designed as internal combustion engine generator sets on standard foundations, with the internal combustion engine generator sets being provided with generators using HTS technology. With such technology, in particular, the generators have windings which are cooled directly or indirectly with liquid neon or liquid nitrogen.

The internal combustion engine generator sets in the case of the equipment system vessels are used in particular for the waterjet drive, or else for in-board motors. In this case as well, the space requirement and the weights are particularly small so that, for example, a waterjet propulsion system can be arranged in the double hull immediately in front of the waterjets. At the same time, in this case as well, the detectability is better than that of conventional electrical machines.

A refinement of an embodiment of the invention furthermore provides that the motors and generators are designed to be shock-resistant with outer and inner shock damping, with the outer shock damping including the motors and generators being installed elastically, in particular on standard foundations and that a stator/rotor system is additionally provided which is elastically connected to the machine housing and can move independently of the housing, that is to say forms a unit which can move independently in the housing and has its own shock damping elements. This configuration of a shock damping system for the rotating electrical components of the equipment system vessels results in a considerable increase in the shock resistance in comparison to electrical machines which are just installed on shock-damped foundations.

In particular the stator/rotor system which can move independently of the housing very considerably increases the shock resistance. The rotating parts no longer strike the stationary parts even in the event of hits in the immediate vicinity, so that the electrical machines can continue to run without being damaged even after a hit in the vicinity.

The shock resistance is also further improved by, according to an embodiment of the invention, providing for the stators of the motors and generators to have air-gap windings. Air-gap windings allow very large air gaps up to 50 mm, thus in this case making it possible to provide an additional safety separation between the rotating parts and the stationary parts of the electric motors and generators.

In this case, it is particularly advantageously possible to accommodate a cryostat in the large air gap which is formed in the housing. Thus, according to an embodiment of the invention, it makes it possible to accommodate a rotor using high-temperature superconducting technology in a shock-damped manner. Since air-gap windings allow stators and rotors to be designed without iron teeth while still being highly efficient, this at the same time also improves the electromagnetic behavior and noise behavior of the electrical machines. Overall, this therefore results in an advantageous electric motor or generator configuration which is particularly suitable for the equipment system vessels.

A further refinement of an embodiment of the invention provides for the vessel hulls to have a pipeline system for liquid neon or liquid nitrogen, to which HTS components such as motors, generators and current limiters can be connected, in particular via quick-release couplings, and for at least one air decomposition unit for production of liquid nitrogen, or a storage unit for liquid neon, to be arranged in the vessel hull, and to be connected via pipelines to the individual HTS components in the vessel hull. This makes it possible to compensate for coolant losses in or at the individual HTS components and to ensure that the individual HTS components can continue to operate reliably. The use of quick-release couplings in this case allows components that are affected to be rapidly replaced by spare units.

Replacement while at sea, which until now has been possible only with difficulty, is in fact possible without any problems by the small and light configuration of the HTS components. This is also true when a decentralized coolant supply is chosen.

A further refinement of an embodiment of the invention provides for the individual type vessels to have electrical power generation units which operate with low emissions and can be installed in a decentralized manner, with provision being made, in particular, for the individual equipment system vessels to have internal combustion engines whose exhaust gas is introduced into the water surrounding the vessel hulls. This results in an equipment system vessel embodiment which operates with low emissions overall, and in which, advantageously, further easily detectable exhaust gas flows, such as hot air from air-conditioning systems or the exhaust gases from reformers for the production of hydrogen can be included in the systems for introducing exhaust gases into the water surrounding the vessel hulls.

An embodiment of the invention also provides for the equipment system type vessels to have power supply units which operate without emissions, in particular in the form of air-breathing fuel cells, which preferably feed their power to a DC network. By using air-breathing fuel cells, there is no need to store pure oxygen for operation of the fuel cells. This thus results in a considerable simplification in the supply of reaction gases to the fuel cells. Only hydrogen reservoirs or reformers which produce hydrogen from a liquid hydrocarbon need be provided on board the equipment system vessels.

Since a wide range of embodiments of such reforms are known, this results overall in a propulsion system which operates without any emissions for the equipment system type vessels, and which can be used without any problems.

While in the case of the propulsion components, such as motors and generators, protypes have predominantly existed in the past, which have also already been subjected to relatively long trials periods, the power supply units which operate without any emissions represent an already proven technology which is used, by way of example, in the field of submarines.

A refinement of an embodiment of the invention in this case provides for the fuel cells to be in the form of PEM fuel cells or to be in the form of methanol direct fuel cells (MDFC) or molten carbonate fuel cells (MCFC). For both operational and cost reasons, it is particularly advantageous in this case for PEM cells and fuel cells with a higher operating temperature to form a power and heat system in which they produce energy as required, corresponding to their different dynamics.

In this case, by way of example, provision is made for the PEM cells to provide the highly dynamic component of the power consumption, and for the fuel cells with a higher temperature to cover the basic load. This results in considerable cost advantages, since the PEM fuel cells are very costly owing to their high catalytic converter component and their likewise costly membranes and the individual components associated with them. This does not apply in a corresponding manner to the fuel cells for a higher temperature, thus allowing a system to be formed which is more cost-effective, only slightly heavier and occupies only slightly more space overall.

According to an embodiment of the invention, the exhaust gases which are produced by the operation of the fuel cells at a higher temperature and/or by the diesel reformers are mixed with the water surrounding the vessel hulls. In fact, not only exhaust gas plumes but also exhaust gas flows without any soot can be detected by infrared detectors, owing to the temperature differences which occur. Introducing all of the heat flows into the surrounding water makes it considerably more difficult to detect them, or makes it no longer possible to detect them horizontally. The heated wake water from an equipment system type vessel according to the invention can now be located only by very highly sensitive satellites.

However, their circulation time is not so short that a considerable change in the vessel location cannot have occurred between one detection event and the next. The point at which a system vessel is located can thus be determined only very sporadically by use of infrared detectors.

A further refinement of the embodiment of the equipment system vessels without rudder blades provides for these vessels to have waterjets which can be controlled independently of one another, in particular waterjets arranged in pairs. The heading of the equipment system vessels can thus still be changed even in the improbable event of a failure of both the thrusters and the steering propellers. The equipment system vessels are thus still maneuverable even when two of the three vessel protection areas comprising the bow, stern and midships are affected. The individual power generation units are also distributed appropriately in the vessel in order that the power can be supplied to the respective propulsion and control components which are still operable.

A further refinement of an embodiment of the invention provides for the equipment system vessels to have AC and DC network elements for connection of the individual power generation and load units. The connection of AC and DC network elements in the equipment system vessels makes it possible for each of the various power generators and loads which are located on board the equipment system vessels to be electrically connected to one another as appropriate for the demand, and thus optimally. In this case, provision is advantageously made for converters which connect the network elements to one another to be arranged between the network elements. The network elements may therefore have different voltages and, in the case of the AC network elements, different frequencies as well. Furthermore, it is possible to design them for different current levels being intended to flow in them to the loads.

One particular refinement in this case provides for a DC network which is equipped with an HTS current limiter to be provided between the fuel cells and the electrical steering propellers. The electrical steering propellers are, according to an embodiment of the invention, the main loads for DC power, and the fuel cells are the main power generators for normal operation. An HTS current limiter makes it possible to reliably cope with short circuits, for example caused by a hit, or else by an insulation fault without arcing occurring in the vessel, which can be disconnected only by means of large switching devices. When mechanical DC switching devices are used, they have the disadvantage that they require a large blowing space, from which toxic gases flow during operation. This can lead to a considerable adverse effect on the health of personnel located in the vicinity, which is reliably precluded by the use of HTS current limiters. Like HTS motors and generators, HTS current limiters are in an advanced state of development and can already be produced and used.

HTS current limiters are advantageously also used between the individual network elements, in particular between DC network elements, in order to allow the individual networks to be disconnected from one another without any problems. One particularly advantageous feature in this case is that one embodiment of HTS current limiters already uses liquid nitrogen cooling. Thus, it is also therefore already possible to avoid the use of expensive liquid neon, which must be carried in reservoirs.

The use of HTS current limiters according to an embodiment of the invention advantageously makes it possible to design a power supply system for equipment system type vessels which can be configured reliably, and at the same time variably, in a previously unknown manner.

One particular embodiment of the invention provides for a higher-frequency network element, for example at up to 400 Hz, to be arranged between the generator (which, in particular, is driven by a gas turbine) for the waterjets. The use of a network element at a higher frequency for supplying electrical power to the waterjets can highly advantageously be implemented using smaller generators than were normally used in the past, with smaller transmissions also being possible between the generators and the high-speed gas turbines. Overall, the higher frequency for a waterjet supply network element means that the gas turbine generator unit for supplying the waterjets with electrical power can be designed to be sufficiently small, even when it is in the Megawatt range, that it can be located in the double hull of a system vessel.

The use of network elements at a higher frequency is particularly advantageous in relatively small vessels since, in this case, the weight problem and the space problem are even more serious than in the case of larger units. Thus, in this case, as well, it is advantageously possible to use network elements with different voltages and frequencies.

A further refinement of an embodiment of the invention provides for the type vessels to have an automation system which has an automation control center which is connected to the individual vessel areas via a bus system which, in particular, is a redundant bus system, in particular via glass-fiber buses. According to an embodiment of the invention, the bus system is advantageously in the form of a segmented network where in the bus itself preferably being redundant and connecting the segmented network in the individual vessel protection areas to the automation control center. This results in a very high degree of transmission reliability which allows the control center to still access the individual vessel protection areas even after major hits.

The control center itself is advantageously designed to operate entirely or partially automatically and such that system-controlled decisions can also be made in it. Normally, the control center provides information only to the vessel control system, for its decisions. In the event of hits on the control center or in the event of other serious disturbances with vessel operation, it is, however, sometimes necessary for the vessel first of all to continue to operate automatically without any human decisions. This is envisaged according to an embodiment of the invention.

For normal operation, an embodiment of the invention provides for the control center to have an advisor system which is at a higher level than the automation. This allows the indication of all measured values, and the display of the system statistics and the circuit constellations.

This ensures that a decision which is made by a human operator is normally available. This is particularly important in battle situations since even the best expert system cannot predict all battle situations. The normal situation is thus operator-controlled vessel control, with the automation system aiding decisions by maneuvering proposals.

The equipment system vessels are advantageously also equipped with a life cycle management system and a status monitoring system for controlling the logistics. The system concept can thus particularly advantageously be made use of. The standardizing of the individual components in the vessel makes it possible to quickly replace components which have reached the end of their life cycle or which have been damaged. The components, which are produced in large quantities and are stored centrally or else in a decentralized manner, can then be quickly transported to the equipment system vessel, and replaced there.

A further refinement of an embodiment of the invention provides for the equipment system vessels to have a standard battle damage control system which is incorporated in the automation systems and also allows all of the internal areas and their states to be displayed on at least one monitor. The equipment system vessels can thus advantageously be operated with considerably smaller crews since leak search teams and damage search teams are largely superfluous. The battle damage control system is able to report all damage to the vessel and in the vessel, and to display this on the bridge. Countermeasures can be initiated automatically, or can be carried out after instruction. An expert system can also advantageously be used for this purpose.

The equipment system vessels according to an embodiment of the invention are, according to the invention, able either to make automatically system-controlled decisions when the safety situation demands this, or at least to make decision proposals for the operator, who can accept or reject them. Automation as the basis for the decisions determines process data measured values, system statistics, circuit constellations and can display them and, developed from this set of processed data, a decision support system/expert system can make a decision proposal presenting the processed situation to the operator so that he can make the decision on the basis of the existing vessel situation. In this case, he can accept the decision proposals from the system or can, for example, reject them on the basis of the tactical situation.

Thus, in the extreme, for example, loss of coolant in the HTS components may be accepted even if this would lead to the expectation of serious damage after some time.

Within the battle damage control system, the statuses of the internal areas as well as the situation on the upper deck are displayed in a processed form and are also distributed to various input channels in the vessel, so that there is no need for the person making the decision to be on the bridge. According to an embodiment of the invention, he can interfere with the automation and battle damage control system at various points in the system vessel and can even control the vessel, for example from the stern.

Power generation and propulsion equipment segments of different power are provided for the equipment system vessels, for example, 7 Megawatt lightweight steering propellers with HTS motors as well as 7 Megawatt waterjets with HTS drive motors for use in frigates, corvettes and a high-speed patrol boat, as well as a slightly restricted waterjet with an HTS drive motor for use in an unmanned attack boat. This includes, for example, gas turbine/diesel engine HTS generator sets of different power and with foundations for different installation locations in the equipment system vessels with power levels of 1 Megawatt, 2 Megawatts, 4 Megawatts and 16 Megawatts.

These equipment segments may be used not only in frigates. They may also be used in corvettes, in high-speed patrol boats and in unmanned attack boats. The fuel cell modules for the fuel cell systems may be of different sizes, by virtue of their fundamental modularity, so that only the individual modules are standardized, for example 30 to 40 KW or 120 to 150 KW. Furthermore, standardized power distribution and on-board power supply segments are used, whose basic parts are identical for frigates, corvettes, high-speed patrol boats and attack boats. All that differs is their pipeline and cable lengths, etc. The automation system for the equipment system vessels is fundamentally the same for all vessels, although, of course, other sensor systems may be chosen and other displays used, depending on the object.

BRIEF DESCRIPTION OF THE DRAWINGS

The invention will be explained in more detail with reference to example embodiments and drawings, which illustrate further details, which are also of an inventive nature.

In detail, in the figures:

FIG. 1 shows equipment system type vessels of different sizes and configurations;

DETAILED DESCRIPTION OF THE EXEMPLARY EMBODIMENTS

Figure 2:
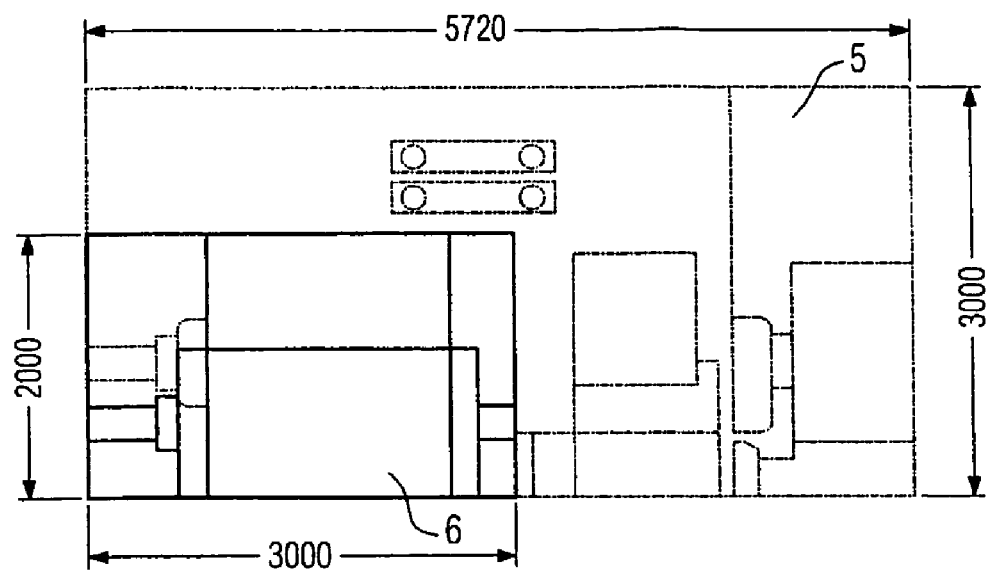
FIG. 2 shows a size comparison between a conventional generator and an HTS generator.

In FIG. 1, 1 denotes a frigate in the form of an equipment system vessel. A frigate such as this has, by way of example, a type displacement of 5000 to 6000 t, its speed is more than 30 knots, and its propulsion is provided by two 7 Megawatt electrical steering propellers and two twin waterjets of 14 Megawatts each, possibly also with a thruster in the bow. The electrical power is generated, by way of example, by two 16 Megawatt generators and four 4.5 Megawatt fuel cell systems.

2 denotes a corvette as an equipment system vessel. By way of example, this has a type displacement of about 2000 t, and its speed is more than 36 knots. It is propelled, for example, by a 7 Megawatt electrical steering propeller and two 14 Megawatt twin waterjets. It has two 16 Megawatt generators and a fuel cell system with twice 4.5 Megawatts.

3 denotes a high-speed patrol boat as an equipment system vessel. This has a water displacement of about 400 t, and its speed is more than 40 knots. By way of example, it has a steering thruster of 0.25 Megawatts and a twin waterjet of 14 Megawatts. The generator power is 16 Megawatts. The fuel cell system power is twice 0.5 Megawatts.

4 denotes an unmanned attack boat which has a type displacement of between 75 and 200 t and whose speed is higher than the speed of the high-speed patrol boat. By way of example, it has a pumpjet as a steering thruster in the stern and has a waterjet whose power is between 5 and 10 Megawatts. The generator power is between 4 and 8 Megawatts. The fuel cell system provides between 2 and 4 Megawatts. Unknown attack boats such as these will have an ever greater influence on future combat, since, equipped with both rockets and torpedoes, they can carry out attacks without any need to be concerned about loss of human life on these vessels. Since they are unmanned, they also can be used as observers in concealed locations for lengthy periods, being activated only when a dangerous situation occurs. Overall, the novel equipment system vessels allow the capability for considerably better, more modern warfare at sea than in the past.

In FIG. 2, 5 denotes the size of a conventional generator with a power of 16 Megawatts rotating at 3600 revolutions per minute. 6 denotes the size of an HTS generator of the same power and rotating at the same speed. In addition, FIG. 2 shows the external dimensions of the respective units. As can be seen from this, it is possible to design the HTS generator to be considerably smaller and lighter than the conventional generator. Appropriate generators are undergoing long-term trials.

Figure 3:
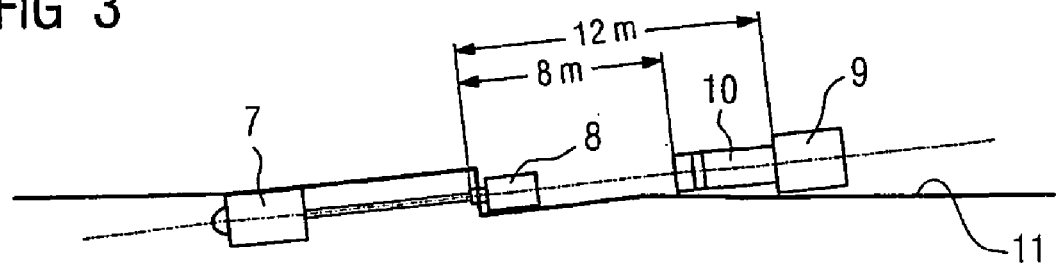
FIG. 3 shows an arrangement comparison for a waterjet with an HTS motor and with a conventional motor.

In FIG. 3, 7 denotes a waterjet and 8 an HTS motor which is used as direct drive. In comparison, 9 denotes the size of a conventional motor as a direct drive, and 10 a conventional motor with a transmission as is normally required. 11 denotes the outer skin of the vessel and, as can be seen from this, the physically small HTS motor means that it is possible to move this considerably closer to the waterjet, thus also resulting in a short propulsion shaft. Overall, the unit formed by the motor and waterjet is considerably smaller, so that it can be arranged in the double hull of a frigate or of a corvette. This opens up completely novel, advantageous opportunities for the design of the midships part of a frigate or of a corvette.

Figure 4:
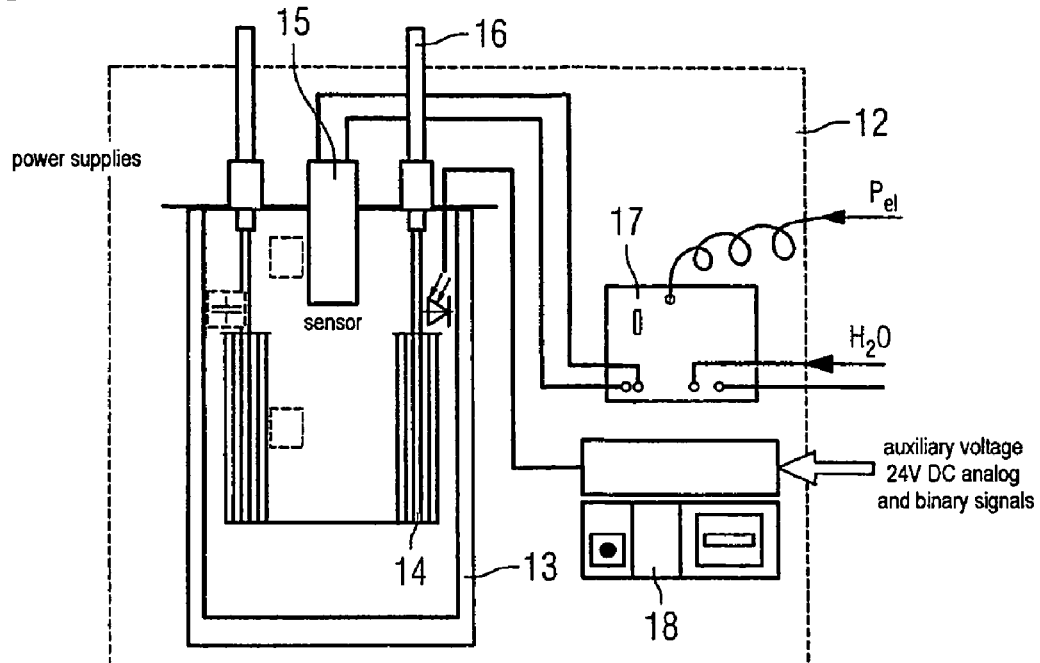
FIG. 4 shows a schematic section illustration of an HTS current limiter with auxiliary units for decentralized coolant production.

FIG. 4 shows an HTS current limiter system 12 in the form of a stand-alone system. The current limiter system 12 contains, as its major components, a cryostat 13 with the current limiter modules which are suspended in the cryostat 13 and on which, in general, HTS conductors are arranged as flat meandering conductors. The busbars 16 are each connected to the network elements to be disconnected and lead to the current limiter modules, which are designed in this way. The liquid in the cryostat, for example liquid nitrogen, is cooled by use of the cold head 15, which is supplied with coolant from the compressor 17. 18 denotes a unit with evaluation appliances, from which signals are also passed to a switching device, which finally disconnects the individual circuits once the current limiter has tripped. A water pipeline for cooling down leads into the compressor. Instead of the compressor, the cold head may also be connected to a connecting line. This is then no longer a stand-alone appliance, but an appliance which is included in a coolant circuit.

Transformers with HTS windings are in principle also operated in precisely the same way as the current limiter modules in the cryostat, can be used between AC networks at different voltages on board the equipment system vessels, and have particularly low losses. Overall, the use of HTS components such as motors and generators, possibly as was well as transformers, results in the component sizes being considerably smaller for a specific power level to be installed. This is a further significant advantage in addition to the reduction in weight and space resulting from the HTS equipment segments!

Figure 5:
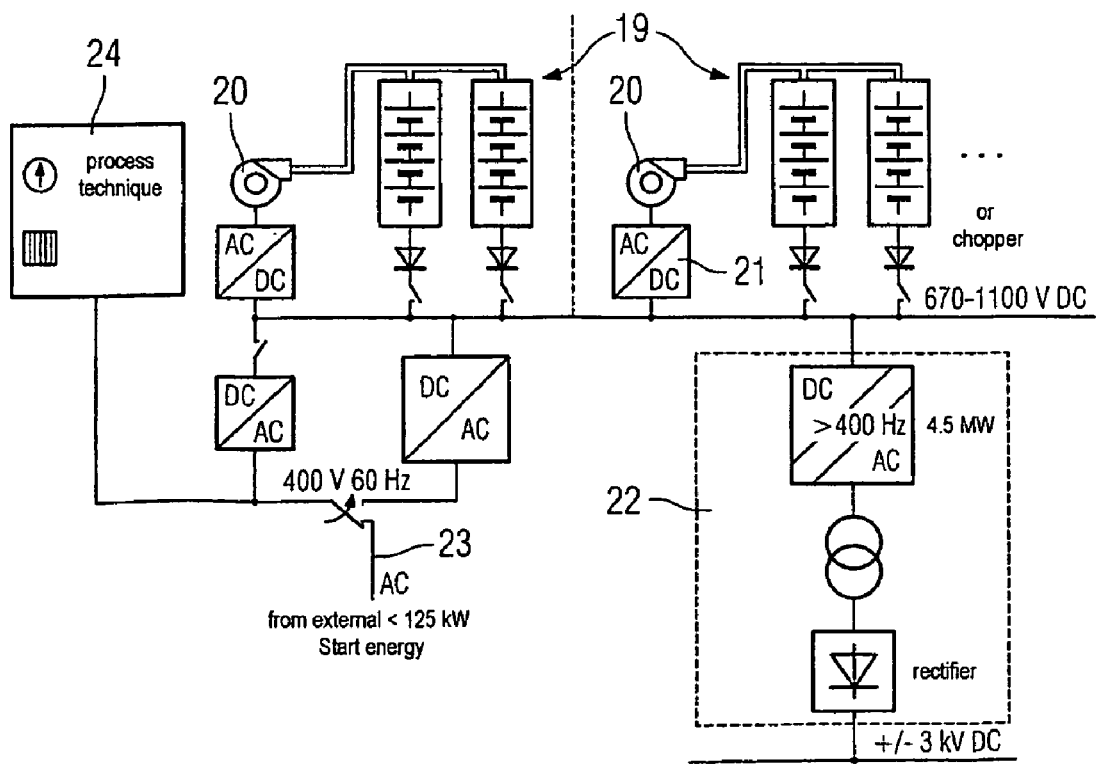
FIG. 5 shows the basic design of an air-breathing fuel cell system.

In FIG. 5, the fuel cells blocks are annotated 19. These include individual modules as indicated in the drawing, which are connected in series. The hydrogen is supplied to the modules without any power consumption, while the compressor motors for the oxidation air-according to the invention, the fuel cells are, in fact, air-breathing fuel cells which are annotated 20-require drive energy. The compressor motors have a DC/AC converter and are supplied with energy via a DC network from the fuel cells. The DC network is raised to 3 kV by way of a DC/DC converter module for the normal DC on-board network voltage for the equipment system vessels. Since the fuel cells require external starting energy, this is supplied at 23, and is converted by way of AC/DC converters. The fuel cell system also has a unit for control purposes with connections to the process components in the system, that is to say by way of example to the hydrogen generator or reservoir.

Figure 6:
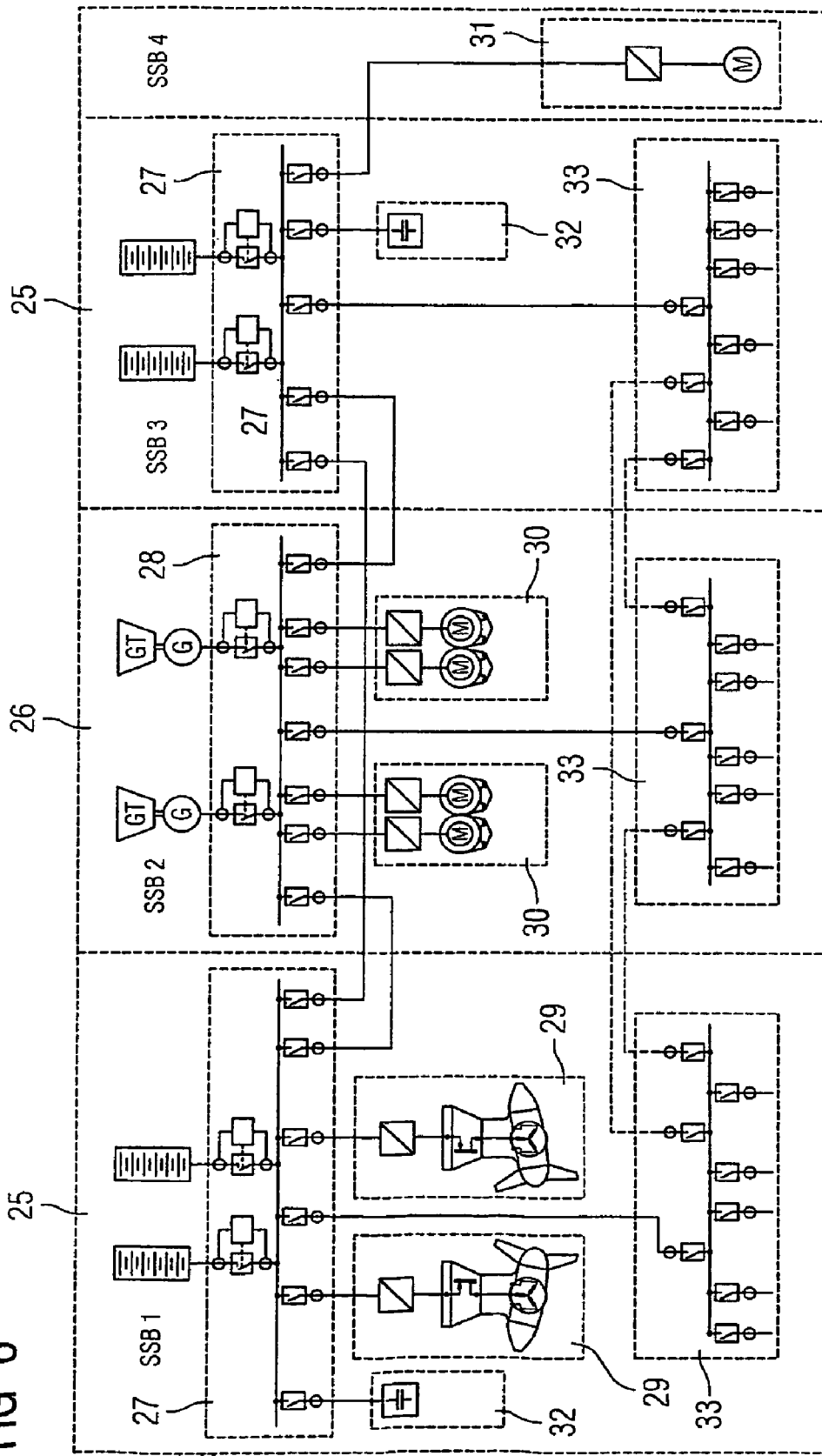
FIG. 6 shows the basic design of an equipment system vessel propulsion network.
Figure 7:
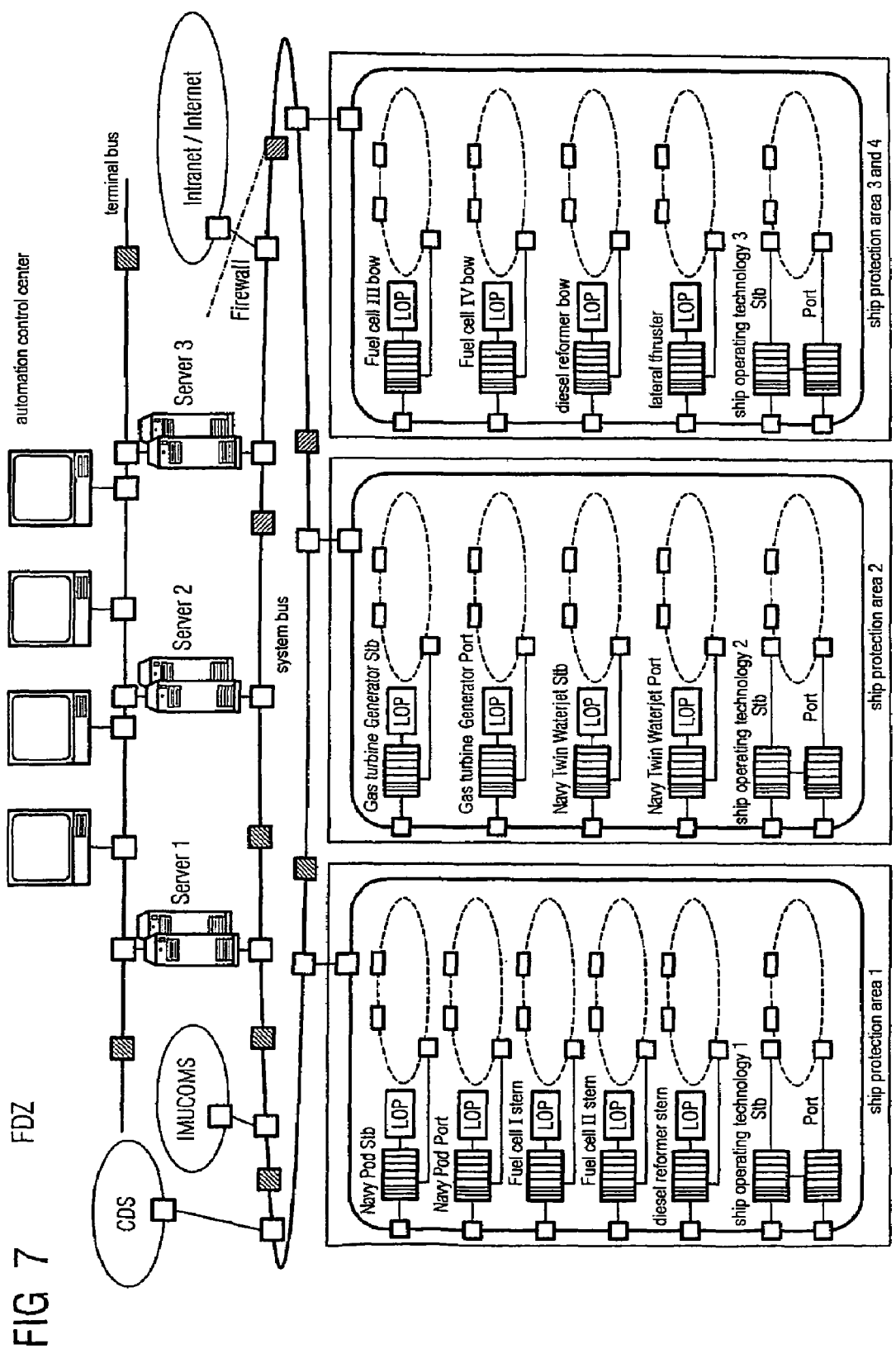
FIG. 7 shows the basic design of an automation system for a frigate.
Figure 8:
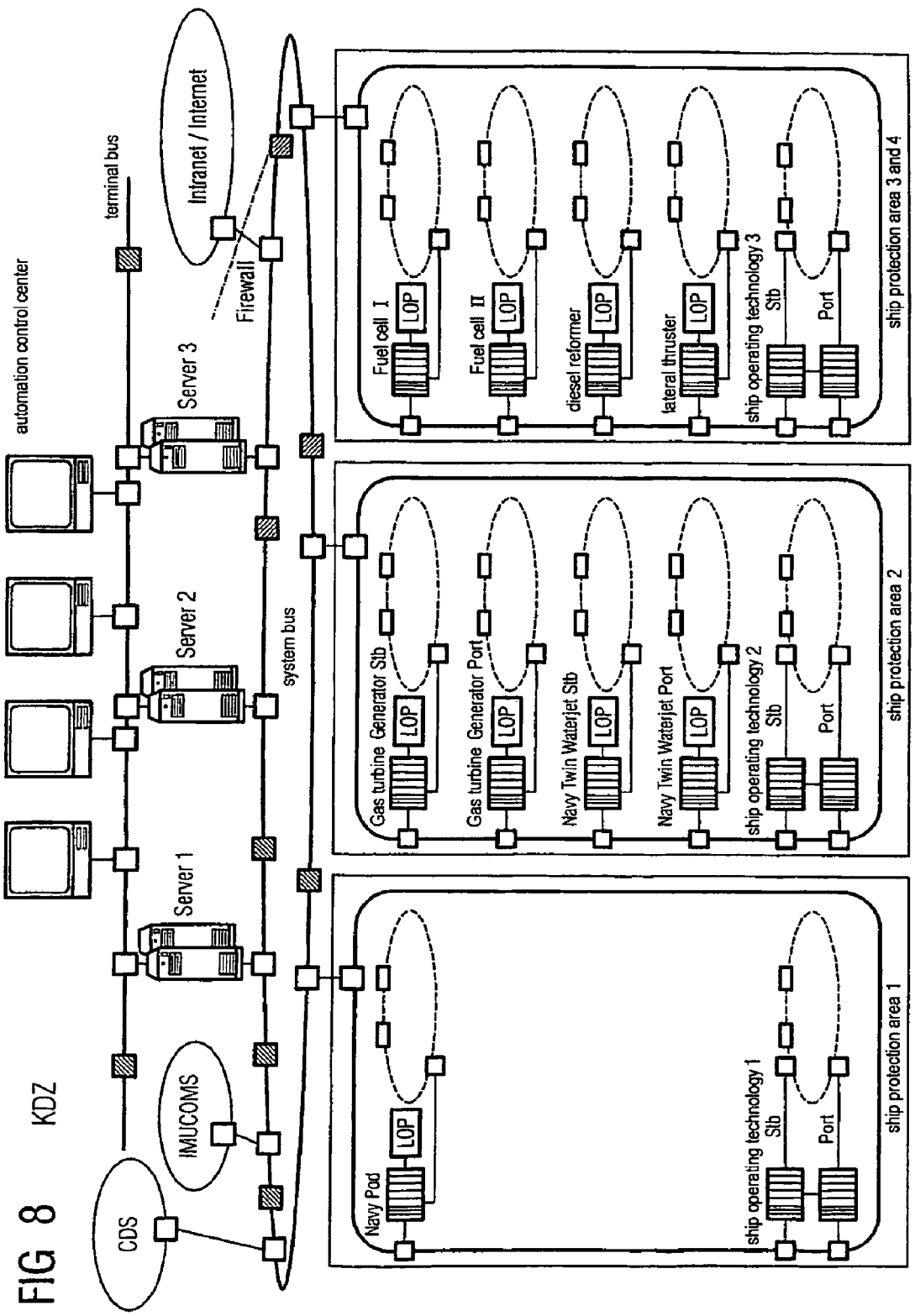
FIG. 8 shows the basic design of an automation system for a corvette.
Figure 9:
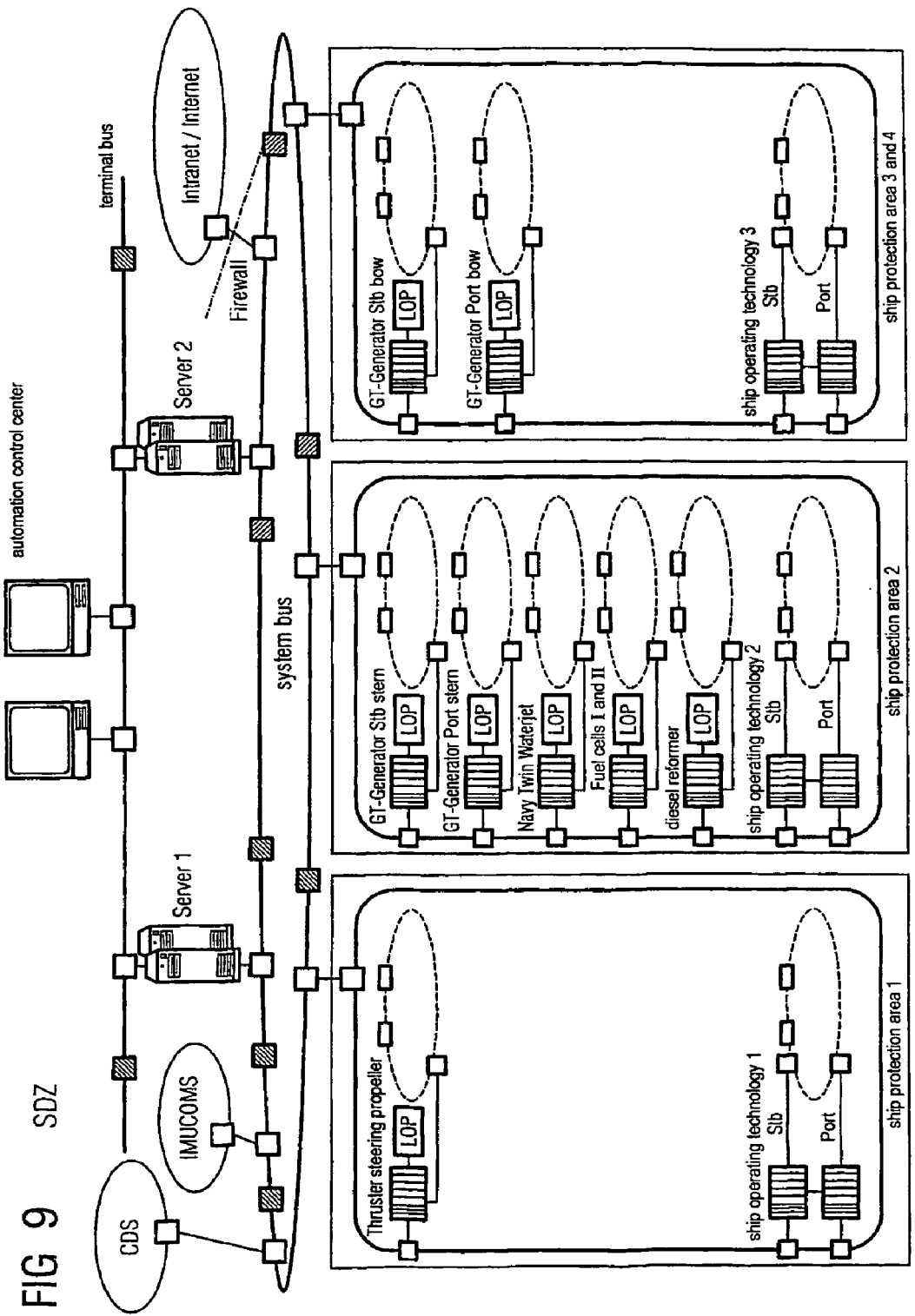
FIG. 9 shows the basic design of an automation system for a high-speed patrol boat.
Figure 10:
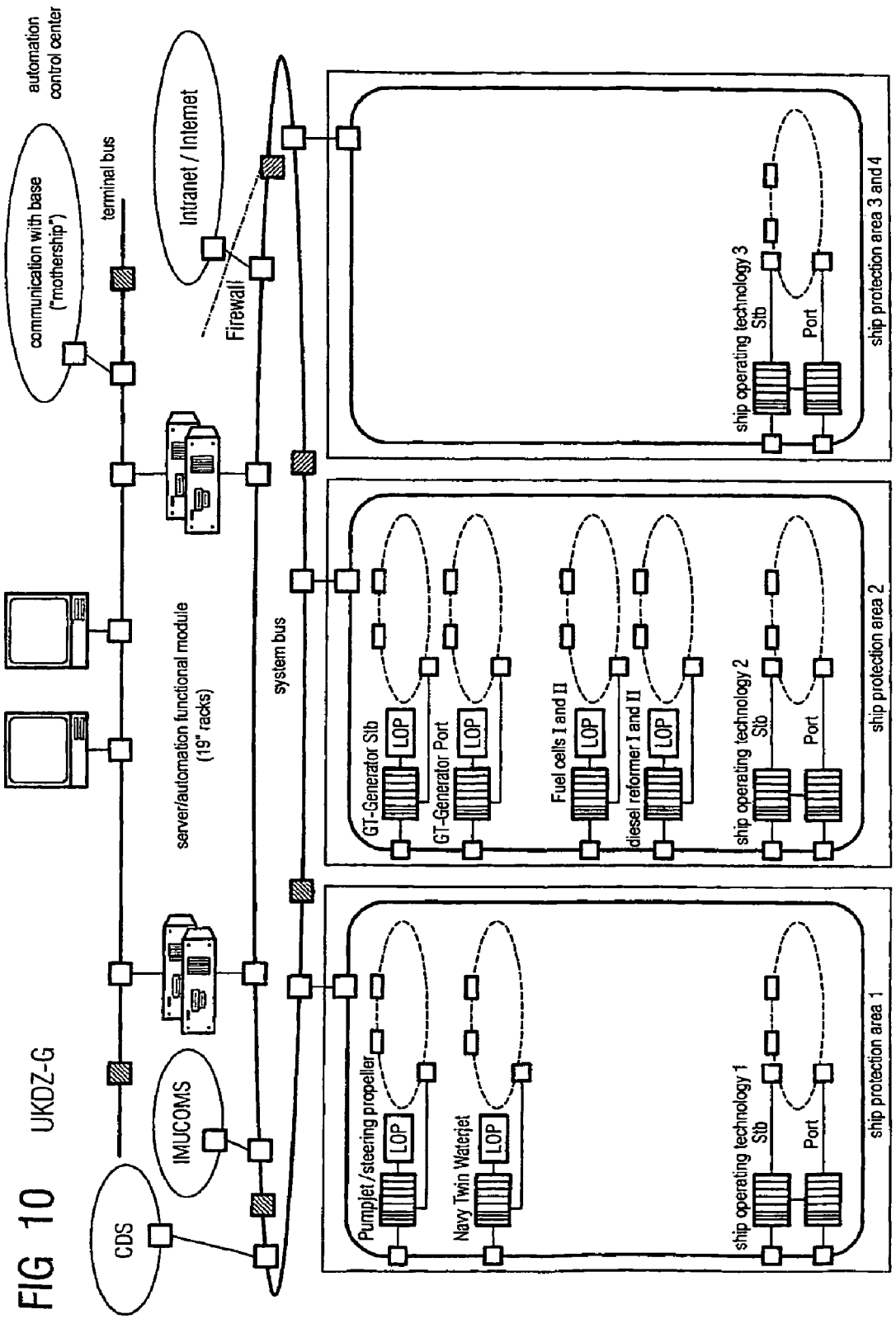
FIG. 10 shows the basic design of an automation system for a large unmanned attack boat.
Figure 11:
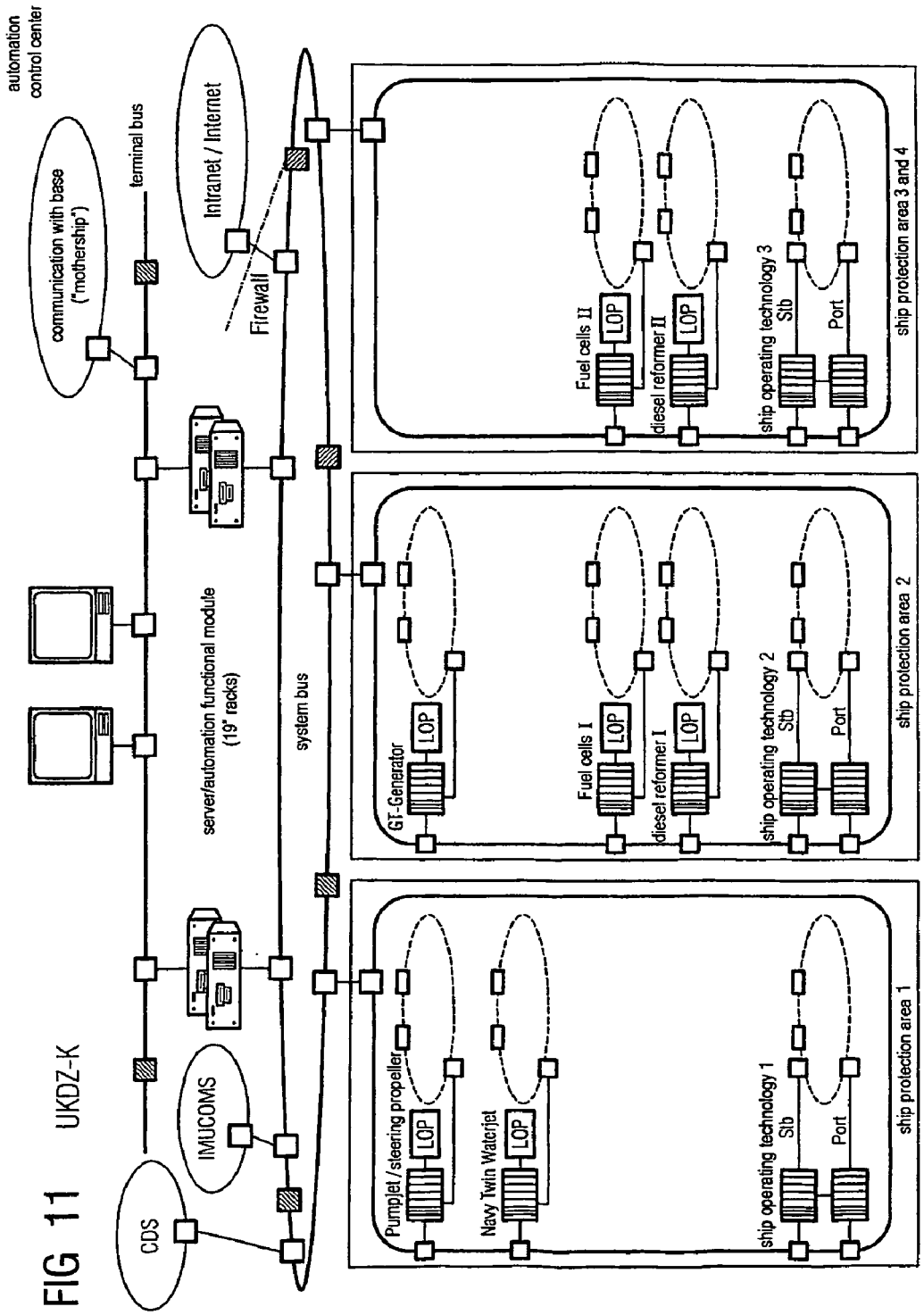
FIG. 11 shows the basic design of an automation system for a small unmanned attack boat.

In FIG. 6, which shows the principle of an on-board network for the equipment system vessels, 25 symbolizes the power generation by way of fuel cell systems. 26 symbolizes the power generation by means of gas turbine generators, and 27 denotes the fuel cell network. 28 denotes the propulsion network of the gas turbine generator, and 29 the cruise-speed propulsion systems. 30 relates to the very high-speed propulsion systems (waterjets) and 31 to an auxiliary propulsion system, for example a thruster. 32 symbolizes the power supply for the weapon systems, and 33 the units for low-voltage distribution, for their switching systems etc. (electrical devices). The individual units are distributed between different vessel protection areas, symbolized by SSB1, SSB2, SSB3 and SSB4. There may also be further vessel protection areas. Overall, this results in a propulsion network and on-board network which is designed to achieve a considerable combat effectiveness improvement in comparison to previous designs and, even after severe hits, for example by a missile, allows the vessel to cope with this, and provides it with the capability to move away from the battle field area.

The symbols and the drawings in FIGS. 7 to 11, which show the automation control centers for the equipment system vessels, are self-explanatory. In this case, as well, the vessel is split, according to the invention, into protection areas which are connected by means of the system bus which, if required, can also be supplemented by point-to-point links at particularly important points. The point-to-point links then form an overlay network, which provides additional redundancy. Glass fiber cables are used both for the system bus and for the overlay network.

The system bus has various interface points from which displays which would otherwise appear on a monitor on the bridge can be called up via a portable computer, and via which control commands can be entered. Since the system bus is also connected to the propulsion components, this allow auxiliary vessel control. The system bus is also advantageously connected to, for example, the Navy's own Intranet or to the Internet. Logistic tasks can thus be handled via it, for example the monitoring of all the drive and propulsion components, switching devices, etc.

The individual monitors and the computation units on the bridge are connected to one another via a terminal bus. This is where the displays are selected and the auxiliary functions are generated, for example for the bridge personnel to make decisions. Overall, this results for the equipment system vessels in a previously unknown display and decision aid which allows vessel management, the monitoring of decentralized drive and propulsion units, the electrical power generation units, the weapon systems, and the systems for monitoring all the other on-board functions to be carried out quickly and easily. This is particularly important to allow the vessel management to maintain control of the vessel at all times, owing to the lack of any centralized engine bay and other central locations in the equipment system vessel.

It is self-evident that, to the extent that they are not specific for navy purposes, the equipment segments can also be used for civil vessels or for vessels carrying out jurisdictional tasks. Their specific advantages remain unchanged.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A navy vessel type equipment system for electrically propelled navy vessels of various sizes and propulsion power, in which the navy vessels include standard equipment segments for propulsion and vessel operation and wherein the individual navy vessel types have vessel hulls which are designed on a type-dependent basis, the system comprising:
equipment segments for propulsion and vessel operation, designed independently of type and combinable depending on the propulsion power and object of the individual navy vessels, wherein the equipment segments are designed to be installable in a prefabricated manner at different locations in the vessel hull, and the equipment system vessels have AC and DC network elements for connection of individual power generation and load units.

2. The navy vessel type equipment system as claimed in claim 1, wherein, in comparison to their power, the equipment segments include small and light propulsion equipment segments which have electric motors using high-temperature superconducting (HTS) technology.

3. The navy vessel type equipment system as claimed in claim 1, wherein, in comparison to their power, the equipment segments have small and light power generation units which are designed as internal combustion engine generator sets on standard foundations.

4. The navy vessel type equipment system as claimed in claim 3, wherein the internal combustion engine generator sets are provided with generators using HTS technology, which, have windings which are cooled directly or indirectly with liquid neon or liquid nitrogen.

5. The navy vessel type equipment system as claimed in claim 2, wherein generators and the motors are designed to be shock-resistant with outer and inner shock damping.

6. The navy vessel type equipment system as claimed in claim 5, wherein the motors and the generators are installed elastically, on standard foundations and in addition have a stator/rotor system which is elastically connected to the machine housing and are movable independently of the housing.

7. The navy vessel type equipment system as claimed in claim 1, wherein generators and stators of the motors have air-gap windings.

8. The navy vessel type equipment system as claimed in claim 1, wherein the vessel hulls have a pipeline system for liquid nitrogen or for liquid neon, to which HTS components are connectable via quick-release couplings.

9. The navy vessel type equipment system as claimed in claim 1, wherein at least one air decomposition unit for the production of liquid nitrogen is arranged in the vessel hull and is connected via pipelines to the individual HTS components in the vessel hull.

10. The navy vessel type equipment system as claimed in claim 1, wherein the individual equipment system type vessels have electrical power generation units which operate with low emissions and are installable in a decentralized manner.

11. The navy vessel type equipment system as claimed in claim 10, wherein the individual equipment system vessels have internal combustion engines whose exhaust gas is introduced into the water surrounding the vessel hulls.

12. The navy vessel type equipment system as claimed in claim 1, wherein the type vessels have power supply units which operate without any emissions, in the form of air-breathing fuel cells, which feed their power to a DC network.

13. The navy vessel type equipment system as claimed in claim 12, wherein the fuel cells are in the form of PEM fuel cells.

14. The navy vessel type equipment system as claimed in claim 12, wherein the fuel cells are in the form of methanol direct fuel cells (MDFC) or molten carbonate fuel cells (MCFC).

15. The navy vessel type equipment system as claimed in claim 12, wherein the PEM and the MDFC or MCFC fuel cells form a power and heat system in which they produce power as required, corresponding to their different dynamics.

16. The navy vessel type equipment system as claimed in claim 12, wherein the fuel cells are supplied from hydrogen reservoirs which are filled by diesel reformers.

17. The navy vessel type equipment system as claimed in claim 12, wherein the exhaust gases which are produced by the operation of at least one of the MLFC, MDFC and the diesel reformers are mixed with the water surrounding the vessel hulls.

18. The navy vessel type equipment system as claimed in claim 1, wherein the equipment system vessels are designed without rudder blades.

19. The navy vessel type equipment system as claimed in claim 18, wherein the equipment system vessels have at least one of steering propellers and lateral thrusters.

20. The navy vessel type equipment system as claimed in claim 18, wherein the equipment system vessels have waterjets which are controllable independently of one another.

21. The navy vessel type equipment system as claimed in claim 1, wherein converters which connect the network elements to one another are arranged between the network elements.

22. The navy vessel type equipment system as claimed in claim 1, wherein the electrical network system is designed such that it has at least one of DC network elements with different voltages and AC network elements with different frequencies and voltages.

23. The navy vessel type equipment system as claimed in claim 1, wherein a DC network which is equipped with an HTS current limiter is provided between the fuel cells and the electrical steering propellers.

24. The navy vessel type equipment system as claimed in claim 1, wherein the on-board network is subdivided into network elements which are connected to one another and whose connections have at least one of HTS current limiters and high-speed semiconductor switches.

25. The navy vessel type equipment system as claimed in claim 24, wherein high-speed semiconductor switches are arranged in the on-board network, by which individual network elements or individual equipment segments are quickly switchable in the event of a hit on the supply network to a supply by parts of the supply network which are not affected by the hit, such that no electrical damage occurs to the components or equipment segments.

26. The navy vessel type equipment system as claimed in claim 1, wherein a higher-frequency network element is arranged between the generator, which in particular is driven by a gas turbine, for the waterjets.

27. The navy vessel type equipment system as claimed in claim 1, wherein the equipment system type vessels have an automation system which has an automation control center which is connected to the individual vessel areas via a bus system.

28. The navy vessel type equipment system as claimed in claim 27, wherein the bus system accesses a segmented network wherein the bus has a redundant design and connects the segmented network in the individual vessel protection areas to the automation control center.

29. The navy vessel type equipment system as claimed in claim 27, wherein the automation control center automatically makes system-controlled decisions when urgent measures for vessel protection require this.

30. The navy vessel type equipment system as claimed in claim 27, wherein the automation control center has an expert system which is in the form of a higher level for automation and which allows all the measured values to be indicated, and allows the system statistics and the circuit constellations to be displayed in a comprehensive, clear form with decision proposals.

31. The navy vessel type equipment system as claimed in claim 28, wherein the equipment system vessels have a life cycle management system and a status monitoring system for controlling the logistics for the equipment system vessels.

32. The navy vessel type equipment system as claimed in claim 27, wherein the navy vessel type equipment system has a battle damage control system which is incorporated in the automation systems and allows all of the internal areas and their states to be displayed on at least one monitor.

33. A vessel type equipment system for electrically propelled vessels of various sizes and propulsion power, comprising:
equipment segments for propulsion and vessel operation as claimed in claim 1.

* * * * *

UNITED STATES PATENT AND TRADEMARK OFFICE
CERTIFICATE OF CORRECTION

| | | |
|---|---|---|
| PATENT NO. | : 7,335,072 B2 | Page 1 of 1 |
| APPLICATION NO. | : 10/527709 | |
| DATED | : February 26, 2008 | |
| INVENTOR(S) | : Wolfgang Rzadki et al. | |

It is certified that error appears in the above-identified patent and that said Letters Patent is hereby corrected as shown below:

On the Title Page item 54 and col. 1, line 1:

The Title should be amended to read:

MARINE-(NAVY) SHIP-TYPE EQUIPMENT SYSTEM FOR ELECTRICALLY DRIVEN MARINE-(NAVY) SHIPS HAVING DIFFERENT SIZES AND DRIVING POWER

Signed and Sealed this

First Day of July, 2008

JON W. DUDAS
*Director of the United States Patent and Trademark Office*